(12) United States Patent
Leon-Rovira et al.

(10) Patent No.: US 10,294,891 B2
(45) Date of Patent: May 21, 2019

(54) ENERGY COLLECTOR SYSTEM APPLICABLE TO COMBUSTION ENGINES

(71) Applicant: INNOVATION MANAGEMENT AND SUSTAINABLE TECHNOLOGIES S.A. DE C.V., Monterrey (MX)

(72) Inventors: Noel Leon-Rovira, Monterrey (MX); Humberto Tellez-Aguayo, Monterrey (MX); Eduardo Mariscal-Hay, Monterrey (MX); Armando Jesús Guerrero-Serrano, Monterrey (MX); Luis Daniel Cedeño-Viveros, Monterrey (MX)

(73) Assignee: INNOVATION MANAGEMENT AND SUSTAINABLE TECHNOLOGIES S.A. DE C.V., Monterrey (MX)

( * ) Notice: Subject to any disclaimer, the term of this patent is extended or adjusted under 35 U.S.C. 154(b) by 59 days.

(21) Appl. No.: 15/350,720

(22) Filed: Nov. 14, 2016

(65) Prior Publication Data

US 2017/0138302 A1    May 18, 2017

Related U.S. Application Data

(60) Provisional application No. 62/254,294, filed on Nov. 12, 2015.

(51) Int. Cl.
*F02G 5/02* (2006.01)
*F01K 11/02* (2006.01)
(Continued)

(52) U.S. Cl.
CPC ............... *F02G 5/02* (2013.01); *F01K 11/02* (2013.01); *F01K 23/06* (2013.01); *F01N 5/02* (2013.01);
(Continued)

(58) Field of Classification Search
CPC ........ F02B 41/10; F02B 37/005; F02B 37/02; F02B 3/06; F02B 71/06; F02B 37/16;
(Continued)

(56) References Cited

U.S. PATENT DOCUMENTS 5,172,784 A    12/1992    Varela, Jr.
7,997,080 B2    8/2011    Harmom, Sr. et al.
(Continued)

FOREIGN PATENT DOCUMENTS

DE    2729998    2/1978
DE    102011003607    8/2012
(Continued)

OTHER PUBLICATIONS

Burch et al. Applications and Benefits of Catalytic Converter Thermal Management. May 7, 1996.*

*Primary Examiner* — Mark Laurenzi
*Assistant Examiner* — Mickey France
(74) *Attorney, Agent, or Firm* — Young & Thompson

(57) ABSTRACT

Disclosed is an energy collector system applicable to internal combustion engines. It may include: a) a collector of thermal energy from the exhaust gases; b) a thermal tank covered by helical tubes to gain heat by the exhaust gases; c) a heat exchanger; and d) an outer element capable of converting thermal energy into mechanical energy, such as a closed Brayton cycle turbine, a Stirling engine, a Rankine turbine or an open loop air motor for converting mechanical energy (coupling the difference in rpm) into electrical energy with an electrical generator. The thermal energy collector may be composed of a heat exchanger that collects energy from the exhaust gases. The electrical energy generated may be used for driving a hybrid vehicle. The thermal tank is capable of storing energy as heat, as well.

7 Claims, 3 Drawing Sheets

(51) Int. Cl.
*F01N 5/02* (2006.01)
*F01K 23/06* (2006.01)

(52) U.S. Cl.
CPC ...... *F02G 2243/00* (2013.01); *F02G 2250/03* (2013.01); *Y02T 10/166* (2013.01); *Y02T 10/6295* (2013.01)

(58) Field of Classification Search
CPC .. F02B 39/00; F02B 77/04; F02G 5/02; F02G 5/04; F02G 5/00; F04B 35/00; F01D 9/026; F01D 17/143; F01D 25/002; F01K 23/065; F01K 23/101; F01N 5/02
USPC .................................. 60/298, 320, 614–620
See application file for complete search history.

(56) References Cited

U.S. PATENT DOCUMENTS

| | | |
|---|---|---|
| 8,095,600 B2 | 1/2012 | Hasha et al. |
| 8,448,440 B2 | 5/2013 | Peoples et al. |
| 8,661,817 B2 | 3/2014 | Harmon, Sr. et al. |
| 8,683,801 B2 | 4/2014 | Ernst et al. |
| 9,276,188 B2 | 3/2016 | Bell et al. |
| 2009/0250189 A1* | 10/2009 | Soukhojak ............ C09K 5/063 165/10 |
| 2011/0041491 A1 | 2/2011 | Thevenod |
| 2011/0289905 A1* | 12/2011 | Acre ....................... F01N 3/043 60/320 |
| 2013/0174544 A1 | 7/2013 | Valetutti |
| 2016/0082949 A1 | 3/2016 | Jang |

FOREIGN PATENT DOCUMENTS

| | | |
|---|---|---|
| FR | 2359974 | 2/1978 |
| FR | 2502692 | 10/1982 |
| FR | 2905728 | 3/2008 |
| FR | 2921689 | 4/2009 |
| MX | 2008015984 | 1/2009 |
| MX | 2008015986 | 6/2010 |
| MX | 2009000965 | 7/2010 |

* cited by examiner

ENERGY COLLECTOR SYSTEM APPLICABLE TO COMBUSTION ENGINES

OBJECT OF THE INVENTION

The object of the invention refers to a novel system to collect heat from the exhaust gases from combustion engines and use the thermal energy collected to generate mechanical energy or electrical energy through a heat engine which is preferably a closed cycle turbine Brayton or some other element capable of converting thermal energy into mechanical energy or electric power, such as for example a Stirling engine, a Brayton turbine, an open cycle air engine or steam turbine. With the electric energy generated a hybrid vehicle can be operated and/or components of the combustion engine, such as the electric generator, oil, water and fuel pumps, the alternator, air conditioning as well as any other equipment requiring drive. One of the advantages of this patent is that the engine is pre-heated at the starting time of the car, instead of waiting to the engine to reach a temperature to move the vehicle. Also, trough the proposed system, the vehicle can is gaining energy not only when the car is going down a hill, as the present hybrid-vehicles do. Moreover, there is a saving in space for the car components, because the system can be coupled with smaller internal combustion engine compared to that of a current hybrid-vehicle, due to the energy collection and savings. This invention is continuation of the patent MX-a-2009-965 Energy Collector System Applicable to Hybrid Cars.

BACKGROUND

The present invention is a new system that collects heat energy from the exhaust gases of a combustion engine and uses the collected thermal energy to operate hybrid vehicles or to drive the systems of a combustion engine such as the oil pump, fuel pump, water pump, alternator or the air conditioning or any other component or device that requires thermal, mechanical or electric energy. Thermal energy from the exhaust gases of combustion engines is collected in a thermal tank with phase change material to minimize the required volume and whose insulation minimizes energy losses. The connection between thermal tank and the internal combustion engine is via a heat exchanger by conduction or by convection, whichever makes a more efficient and secure setup, and minimize heat losses. Patent MX-a-2009-965 was previously obtained, for an energy collector system applicable to hybrid cars, it refers to a novel power system for hybrid vehicles in which, the energy supply is performed through a solar collector, the thermal energy is stored, and subsequently delivered to a conversion system that produces electrical energy by means of a Stirling engine, a closed cycle Brayton turbine or any other element capable of converting thermal energy into mechanical energy, such as a Rankine turbine or an open cycle air engine.

U.S. Pat. No. 5,172,784 Hybrid electric propulsion system, mentions a hybrid vehicle with an external combustion engine, that works with external heat produced by liquid fuel and does not have any thermal energy storage, therefore it does not work based on heat energy recovered from combustion engines. This way, the differences with this document is that it uses fuel to generate heat, while the proposed invention uses the energy from the exhaust gases or residual heat, then stores the heat in a tank containing phase change material. Also, the way the connection is made between the thermal tank and the heat engine is different in the proposed invention. Another document that describes a thermal tank of similar characteristics to the one used and developed by ourselves is patent Mx/a/2008/015984 which led us to see the advantages of this invention compared to the others. The invention described herein uses energy from exhaust gases making it totally different to those above mentioned devices.

In 1971 the Department of Energy (DOE) began a research on the use of Stirling engines in cars. Together with other institutions and companies such as NASA, General Motors (GM) and Stirling Thermal Motors (STM) and created prototypes of vehicles with Stirling engines and mechanical drives all the way to the tires. Technical reports show that these vehicles had properties similar to conventional cars of that era. The latest prototype of those investigations seems to be a Chevrolet Lumina '95, in a hybrid configuration (serial hybrid) a Stirling engine from STM, which generates electricity but the power source used is gasoline. Despite the earlier success, this prototype did not meet basic requirements and especially did not achieve the expected performance. During the DOE's program, research was made on the use of alternative fuels such as natural gas, however, they do not mention the use of exhaust gasses nor waste heat from any industrial process, and therefore the technical reports make it totally different to the invention presented here.

Furthermore FR 2905728 A1 and patent pending in the USPTO 20110041491, both for the inventor Thévenod, Frederic, is based on the use of a heat engine that uses the heat source with a working chamber of variable volume where reception power is for heating the working gas outside the chamber in contact with the external heat source in which the heat engine operates on a two stroke cycle in which a discharge phase, compression phase and transfer phase outgoing continue in each other in a single motion reduction chamber volume. This being completely different from the invention presented here, where energy is collected on phase change from solid to liquid in a heat insulated tank for thermal energy to be delivered through a heat exchanger preferably to a Brayton turbine driving an electric generator which charges the batteries of a hybrid vehicle. Moreover, the French Patent 2359974 and German Patent DE2729998, both of inventor Brecheisen Adell Warren refer to an internal combustion engine having a turbocharger relief mechanism, so it can work even if the exhaust gases' total energy would fall below a given value. This invention integrates to the assembly constituted by an internal combustion engine associated to an auxiliary drive device a turbocharger that receives an assistance of drive when the regime falls below a determined value. This being completely different from the invention presented here, where energy is collected on phase change from solid to liquid in a heat insulated tank for thermal energy to be delivered through a heat exchanger preferably to a Brayton turbine driving an electric generator which charges the batteries of a hybrid vehicle.

French Patent 2502692 proposes a heat recovery system for the thermal energy of the exhaust gas in an internal combustion engine. It is based on convection of a liquid, that can be water flowing through a spiral tubing around the exhaust into a thermal reservoir. This system is not based on the use of the phase change between solid and liquid media to minimize the volume required. This also has the limitation that only low temperature levels can be used, since otherwise, high pressures would be obtained. Also this patent does not involve any engine that uses the recuperated heat to aid in moving the vehicle itself or to drive its accessories. As can be seen the present invention differs fundamentally from this solution.

French Patent 2921689 "Heat recovery device for an exhaust system with integrated heat exchanger for recovering heat of exhaust gas of an internal combustion engine" discloses a heat recovery system based on convection, where a liquid, which may be water flowing through a pipe in a spiral around the exhaust passage transfers the heat to a thermal container. This system, as can be seen, is not based on the phase change material from solid to liquid to minimize storage volume. This solution is also limited to the value of the temperature at which the thermal energy is stored as the vapor pressure of the liquid leads to that the values are limited to the evaporation temperature of such liquid.

Patent application US 20160082949 A1 "System for improving exhaust gas purifying performance of diesel hybrid electric vehicle" explains a system for improving exhaust gas purification performance in which an SCR catalyst is equipped in an exhaust line to reduce nitrogen oxide within exhaust gas. This system involves a hybrid control unit to turn off an engine for the vehicle to go into hybrid driving mode and another control unit to determine if there is a request of an engine off from the hybrid control unit. However, the difference from this patent is the use of a phase change from solid to liquid in a heat-insulated tank for energy to be delivered through a system involving a turbine propelled by heat energy from the exhaust gases of a combustion engine and uses the collected thermal energy to operate a hybrid vehicle, in which the system can be coupled with that of a series or parallel hybrid vehicle. Thus, this patent is different from some others including steam turbine solutions such as U.S. Pat. No. 7,997,080 B2 Internal combustion engine with auxiliary steam power recovered from waste heat. A combination internal combustion and steam engine includes a cylinder having a piston mounted for reciprocation therein with an internal combustion chamber and a steam chamber in the cylinder adjacent; U.S. Pat. No. 8,661,817 B2 (High efficiency dual cycle internal combustion steam engine and method. The coolant in the cooling jacket of a dual cycle internal combustion steam engine is intentionally maintained at an elevated temperature that may typically range from about 225° F.-300° F. or more.) and U.S. Pat. No. 8,448,440 B2 (Method and apparatus for achieving higher thermal efficiency in a steam engine or steam expander. A high order of thermal efficiency is achieved in a steam engine or steam expander having a piston clearance that approximates zero together with a negligible amount of compression). Also, this invention is different from U.S. Pat. No. 9,276,188 B2 (Thermoelectric-based power generation systems and methods. Some embodiments provide a waste heat recovery apparatus including an exhaust tube having a cylindrical outer shell configured to contain a flow of exhaust fluid; a first heat exchanger extending through a first region of the exhaust tube, the first heat exchanger in thermal communication with the cylindrical outer shell) and similar ones using thermoelectrical components such as Peltier, Seebeck and Thomson, which are different from a Brayton Cycle turbine due to this patent achieving higher efficiency and a more compact solution.

There are several patents that mention the use of the Rankine cycle and the exhaust gas recovery:
Patent publication DE102011003607 A1 by BMW claims a method to produce mechanical power of an expansion machine using the heat of the exhaust gas of the vehicle with a feed pump on circuit run in an evaporation-pressure medium to evaporate a fluid and then to the machine for cooling and expansion in order to create mechanical work.

Also, Patent US 20130174544 A1 describes a system to obtain a electric supercharged hybrid drive mechanism by means of a Rankine cycle with a heat exchanger with liquid-phase medium which is water, turbine, pipes system, a condenser and a pump. Moreover, U.S. Pat. No. 8,683,801 B2 claims a method involving a Rankine cycle of heat recovery in which the system includes a fluid going to a heat exchanger coupled to a heat source of an internal combustion engine with a conversion device in the fluid's path.

However, the proposed patent is different to all of them due to the use of a Brayton cycle turbine and a thermal tank with a phase change material to recover energy from the exhaust gas as by using this cycle there are improvements in important factors such as efficiency and the reduced size of the system.

Figure 3A:
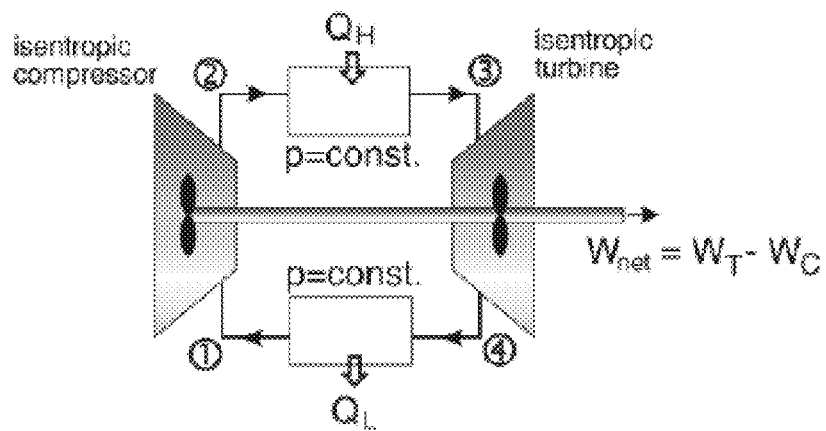
Figure 3B:
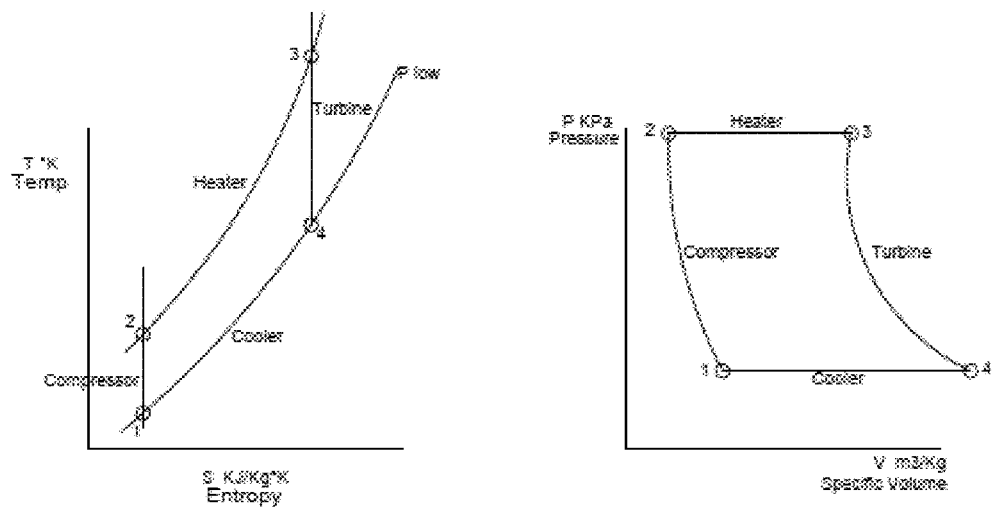

With that high temperature and pressure the gas of the turbine closed cycle enters the Brayton turbine (9), in which it expands and drives the turbine while its temperature and pressure decreases. Then, the helium goes through the cooler (10) from where it exits at lower temperature and pressure and goes to the compressor (7) thus starting a new cycle where its pressure increases for being send back to the tank (4) in order to be heated again by the PCM, as shown in FIGS. 3a and 3b.

Figure 1:
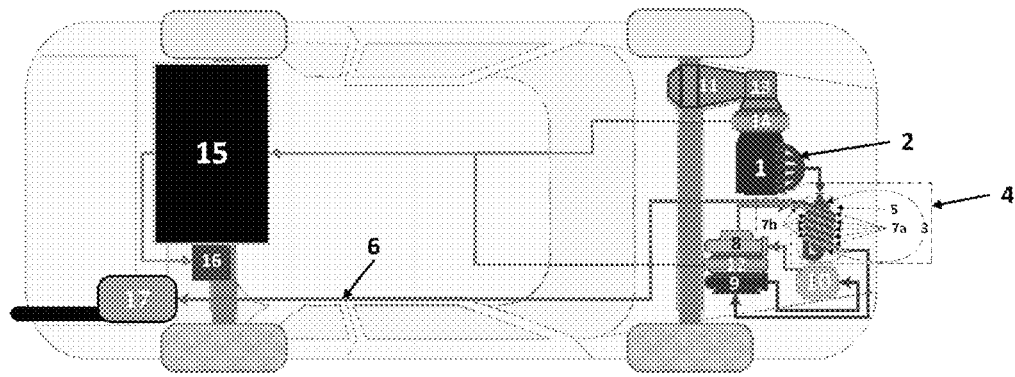
FIG. 1. describes the proposed exhaust gas energy recuperation system where the hot exhaust gases go from the internal combustion engine (1) through the exhaust multiple (2) to the catalytic converter (3) and gets out through the helix shape tube (7a) that wraps the same converter (3) and is covered by phase change material (PCM) (5) that are contained in the isolated thermal tank (4). Then, after melting the PCM, the exhaust gases are expelled at a lower temperature through the exhaust tube (6) and the muffler (17).

The Brayton turbine in FIG. 1 drives a generator (12) that provides electric energy to the battery pack (15). As in state of the art hybrid parallel vehicles, the differential (11) is driven by a differential transmission (14) that joins the energy of the combustion engine (1) and of the electric motor/generator (14) that is driven by the battery pack (15) controlled by the power electronic (16). As in state of the art hybrid cars, the electric motor/generator drives the car when required and stores electric energy when is driven by the kinetic energy of the car by braking and/or downhill.

As, thank to this solution, additional electric energy is available compared to state of the art hybrid vehicles, the power electronic will be providing more energy to the electric motor and reducing the energy taken from the combustion engine for driving the vehicle and even switching of the combustion engine when it results convenient.

This way, the fuel consumption will be reduced in the amount that is obtained from the exhaust gas energy recovering system.

FIG. 3a shows the ideal Brayton closed thermal engine set up, and FIG. 3b shows the ideal closed Brayton Cycle.

The ideal set up (3a) in which number 1 represents the isoentropic process in which pressure is applied to the ambient air by being captured into the compressor, then there is an isobaric process involving the air going to an isobaric chamber to heat the air by adding heat at a constant pressure. After this, in number 3, which is another isoentropic process the air expands through the turbine and the compressor is driven with some work extraction. Finally the isobaric process in number 4, heat is expelled to the environment.

In the closed Brayton Cycle (2b) the graph shows the temperature entropy diagram: first there is the compressor where pressure is increased, later at the heater there is an increase in temperature and in the turbine heat is released for driving the turbine and afterwards at the cooler the temperature is reduced and the cycle restarts.

DETAILED DESCRIPTION OF THE INVENTION

Energy collector system applicable to internal combustion engines comprising a heat exchanger for exhaust gases to store thermal energy by phase change material and use the collected thermal energy to generate mechanical and/or electrical energy by a thermal engine which is preferably a closed Brayton cycle turbine or some other element capable of converting external thermal energy into mechanical energy or electrical energy such as a Stirling engine, a Rankine turbine or open cycle air motor. The stored thermal energy is delivered to the thermal engine through a novel heat exchanger.

Figure 2:
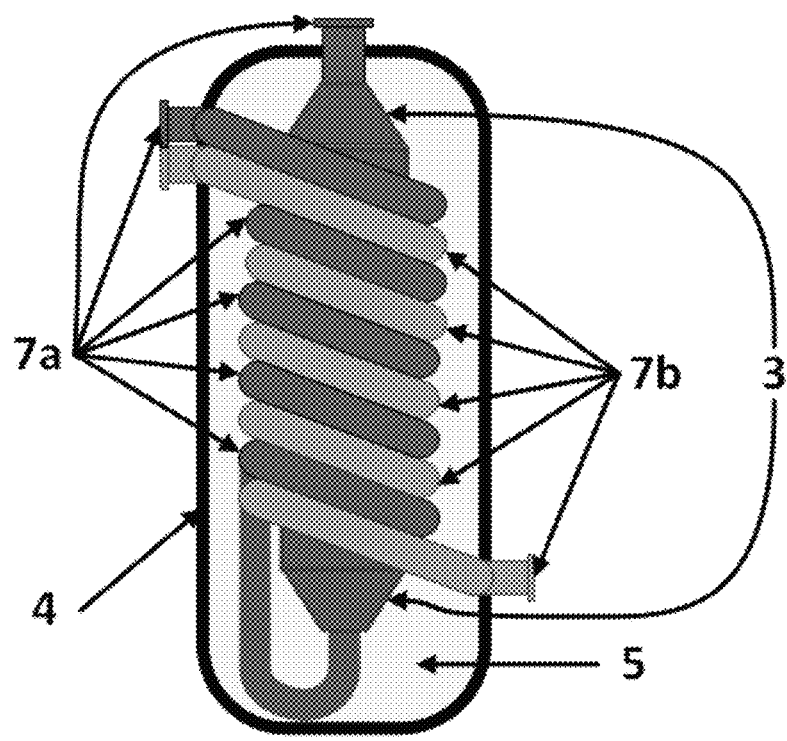
FIG. 2. Shows the details of the tank (4) fed by the exhaust multiple (2) and the helical tubes (7a and 7b) wrapping the catalytic converter (3) in which the tank (4) that contains the catalytic converter (3), one additional helix tube (7b) contains the gas of the turbine closed cycle, which is preferable helium, which is heated by the phase change material. This way both helix shaped tubes (7a and 7b) together with the PCM (5) make up the heat exchanger. The helium that is compressed by the compressor (8) of the Brayton turbine flows through the helix tube (7b) where its temperature is increased by the PCM. For a better heat exchange the helium enters the heat exchanger at the point where the escape gases leave it.

The entire system of the hybrid vehicle (FIG. 1) consists of a heat tank (4), a heat exchanger (FIG. 2), a thermal engine (8, 9) that converts external thermal energy into mechanical energy, a generator (12) and an electrical system (15, 16)). The system of energy recovering includes: Collector of the thermal energy of the exhaust gases (2) by a heat exchanger (FIG. 2) which first flows through the catalytic converter and distributes the thermal energy through the helical tube 7a to the PCM (5) thus minimizing the volume required to contain the thermal energy stored. Insulation layers of the tank (4) are sized to avoid heat losses. The helical tube (7b) coming from the compressor side of the Brayton turbine, containing an inert gas, preferable helium to get the thermal energy from the PCM and driving the turbine. The thank is covered by the tubes, thus set up makes it possible that the catalytic converter gets the required temperature from the exhaust gases and remains at a high temperature as it is immersed in the PCM that is contained in the isolated tank. This way the catalytic converter does not get cool from one day to the next, and delivers the catalytic conversion function since the engine is started. It will remain at operational temperature as long as the temperature inside the thermal tank is hold at the temperature of the phase changing material. The insolation of the tank is performed in a way that the temperature is maintained for more than 48 hours. Therefore, the advantage offered by the catalytic converter, is that it will work at its optimal temperature since the first moment when the combustion engine is ignited, instead of waiting to the engine to reach a temperature to move the vehicle.

The thermal tank (No. 4) delivers thermal energy to the heat engine (8, 9) which is preferably a closed Brayton cycle turbine or some other element capable of converting external thermal energy into mechanical energy, such as a Stirling engine, Rankine turbine or open cycle air motor.

A preferable embodiment consists of a closed turbine Brayton cycle by which the heated helium in the tube 7b delivers the thermal energy and the Brayton turbine (130,000 rpm-160000 rpm) drives the generator (12) which delivers electric energy to the battery package. The electricity generated is stored in the battery package and may be delivered to the electric motor/generator that drives the hybrid vehicle. It can also be used for driving the components of the combustion engine (3700-4900 rpm). This reduces pollution because it uses energy that would otherwise be lost and thus minimizes the fuel consumption of the combustion engine because this energy is stored in the heat tank (4) which collects thermal energy available in the exhaust gases and which is free and does not require any toxic material for piping and storage. The system can be adapted to conventional hybrid vehicles so that additional energy savings is achieved and even save space for the car components, because the system can be coupled with smaller internal combustion engine compared to that of a current hybrid-vehicle.

This can also be used to ensure 100% electric-powered hybrid vehicle when circumstances so require.

The heat engine (8, 9) requires that a cold side is always maintained, since it works with temperature difference; for that to occur a radiator (10) is used. Cooling air is heated and this temperature increase can be used to reduce heat losses of the heat tank, heating the its outer surface.

On the other side, the electric motor/generator (14) acts as a normal parallel hybrid car, where advanced electronics allow it to act as a motor (180-230 Nm, 50-65 kW with efficiency of 75-90% and energy density of 1-2.5 kW/kg) as well as a generator (35-46 Nm, 32-46 kW, 75-90% efficiency and energy density 1-2.5 kW/kg). When it needs to, it can draw energy from the batteries to accelerate the car. But acting as a generator, it can slow the car down and return energy to the batteries (power density of a Li-Ion of 30-40 Watt-hr/kg).

The combustion engine (1) and the electric motor/generator (14) are connected by variable differential transmission (13) to the vehicle's drivetrain. The proposed system is competitive and minimizes the emission of polluting exhaust from combustion engines, because it reuses the energy of the combustion engine that would otherwise be lost and the vehicle is gains energy not only when the car is going down a hill, as the present hybrid-vehicles do. As it uses the heat energy contained in the exhaust gas to generate electricity; using simple processes having a high efficiency thermal tank (4) that can use various phase change materials which provide energy storage and are accessible, for example salts which are less polluting and have the ability to store higher energy density than electric batteries. The proposed system minimizes the emission of polluting exhaust because the catalytic converter is held at its optimal operating temperature as long as 48 hours after shutting down the combustion engine, eliminating the polluting emissions that occur when it starts at ambient temperature when the combustion engine is ignited.

Parts of the System:

As mentioned above capturing energy from exhaust gas can be performed through heat exchanger (FIG. 3). This can be done in any internal combustion engine powering mobile vehicles, agricultural machinery, construction machinery and ships, as well as combustion engines that power stationary equipment. The energy is captured and stored as heat in a thermal tank (4), which uses phase changing materials to store thermal energy by changing the state (solid to liquid or gas) and when required can deliver such energy through heat exchanger (FIG. 3). The thermal tank is constituted by the following:

Materials that keeps the heat in the range of 300 to 1000° C., such as molten salt or aluminum which store thermal energy with a temperature about 700° C.

But the object of this invention does not focus on the heat tank as documents as patent Mx/a/2008/015986 describes a device for storing thermal energy using a thermal interface, and can then deliver it via an interface by conduction or convection to an external device: the device stores the thermal energy by melting of a material contained therein, which may be salt or a metal as aluminum and utilizes the latent heat of fusion for thermal energy storage with high energy density.

The thermal tank (4) has an insulation, which may consist of several layers of insulation to minimize heat losses. An alternative option is to use layers of nested vacuum. The insulating layers may optionally be combined with layers of silicon nanowires, or any material that converts heat directly into electricity. The outer layer of the tank can be heated with the final gas escapes of the heat engine. Tank (4) is placed in proximity to the combustion engine exhaust. Isolation has the characteristic that the outside temperature of the tank does not cause risks in handling and its storage capacity shall be sufficiently effective to keep the heat inside the tank a period of time longer than 24 hours without significant loss of energy.

For best performance by heating the tank or extracting energy from the hot material, the tank has two metallic helix tubes (7a) which delivers the escape gases energy to the PCM and (7B), which gather the heat energy stored in the PCM (5) for driving the heat engine. This way heating the phase change material is more uniform and the energy transfer to the thermal engine is maximized. The heat exchange between the thermal tank (4) and the hot part of the heat engine (9), preferably applies for a closed Brayton cycle turbine or some other element capable of converting external thermal energy into mechanical energy such as a Stirling engine, a Rankine turbine or open cycle air motor.

The preferred material for the helical tubes of heat exchanger is copper because of its high conductivity, however, it is not excluded that other metals are used to withstand the temperatures of the phase changing material.

It is also possible: transferring heat through a convection system thermo syphon or "heat pipe", in whose interior is a material whose evaporation temperature is lower than the temperature of the surface of contact with the heat tank, so that its vapor transmits the desired temperature into the heat engine—in general heat engines function based on the difference between the hot side and the cold side. The material used for the heat exchanger must withstand high temperatures and have good heat transfer coefficient. Such material may be in solid or liquid state at low temperature and, when heated to the temperature of the heat from tank it changes its phase.

The heat energy stored can also be used for operating an air conditioning system by absorption, adsorption or ejector-compression.

It is possible to take the cooling air from the environment for the cooling system of the heat engine, and then send it via conduits for heating the outer surface of the thermal tank (4).

In the case of a serial hybrid there is also the option of having independent electric motors in the wheels without the use of the gear transmission.

In the case of a parallel hybrid, there are two options: the first one is to have one motor/generator and one additional electric motor driven by the Brayton turbine, and the second option is to have one motor/generator powered through a transmission connected to both: the MCI and the Brayton turbine.

The invention claimed is:

1. A heat exchanger applicable to an energy collector system applicable to internal combustion engines having an exhaust system including a catalytic converter and an outer element configured to convert thermal energy into mechanical energy, the heat exchanger comprising:
    an isolated tank having at least two apertures and defining an internal cavity, the catalytic converter being disposed inside of the internal cavity, the catalytic converter having an exhaust gas tube inlet entering the internal cavity through a first aperture and an exhaust gas outlet facing the interior of the internal cavity;
    a first helical tube having an inlet and an outlet, the first helical tube being coiled around the catalytic converter and in thermal contact therewith, the first helical tube inlet being connected to the exhaust gas outlet of the catalytic converter, inside the isolated tank, the first helical tube outlet exiting the isolated tank through a second aperture and being further connected to the exhaust system of the internal combustion engine to release the exhaust gases to the atmosphere; and
    a second helical tube having an inlet and an outlet, the second first helical tube being coiled around the catalytic converter and in thermal contact therewith, intercalated between the first helical tube, the second helical tube inlet passing through a third aperture to the outside of the isolated tank and being connected to a gas exhaust of the outer element configured to convert thermal energy into mechanical energy, the second helical tube outlet passing through a fourth aperture to the outside of the isolated tank and being connected to a gas inlet of the outer element configured to convert thermal energy into mechanical energy,
    wherein the isolated tank contains a phase change material in which the catalytic converter, the first helical tube, and the second helical tube are completely immersed, the phase change material being heated by the catalytic converter and by the first helical tube conducting the hot exhaust gas of the internal combustion engine, and
    the gas circulating through the second helical tube is heated at least by the catalytic converter and by the phase change material, the heated gas exiting through the gas outlet to be used by the outer element configured to convert thermal energy into mechanical energy.

2. The heat exchanger as claimed in claim 1, wherein the second helical tube forms a high pressure closed circuit with the outer element configured to convert thermal energy into mechanical energy.

3. The heat exchanger as claimed in claim 1, wherein the second helical tube forms a high pressure closed circuit with the outer element configured to convert thermal energy into mechanical energy, and
    wherein the gas circulating through the second helical tube and said closed circuit is helium.

4. The heat exchanger as claimed in claim 1, wherein the inlet of the second helical tube is located at a location of the outlet of the first helical tube.

5. The heat exchanger as claimed in claim 1, wherein the second helical tube forms a high pressure closed circuit with the outer element configured to convert thermal energy into mechanical energy, and wherein said outer element comprises a Brayton turbine having a compressor.

6. The heat exchanger as claimed in claim 1, wherein the second helical tube is in thermal contact with the first helical tube.

7. The heat exchanger as claimed in claim 1, wherein the outer element is one of a closed Brayton cycle turbine, a Stirling engine, a Rankine turbine, and an open loop air motor configured to convert mechanical energy, coupling the difference in revolutions per minute (rpm), into electrical energy with an electrical generator.

* * * * *